Sept. 25, 1962 J. T. VAUGHAN 3,055,959
ELECTRICAL DEVICE FOR INDUCTION FURNACES
Filed Nov. 24, 1959
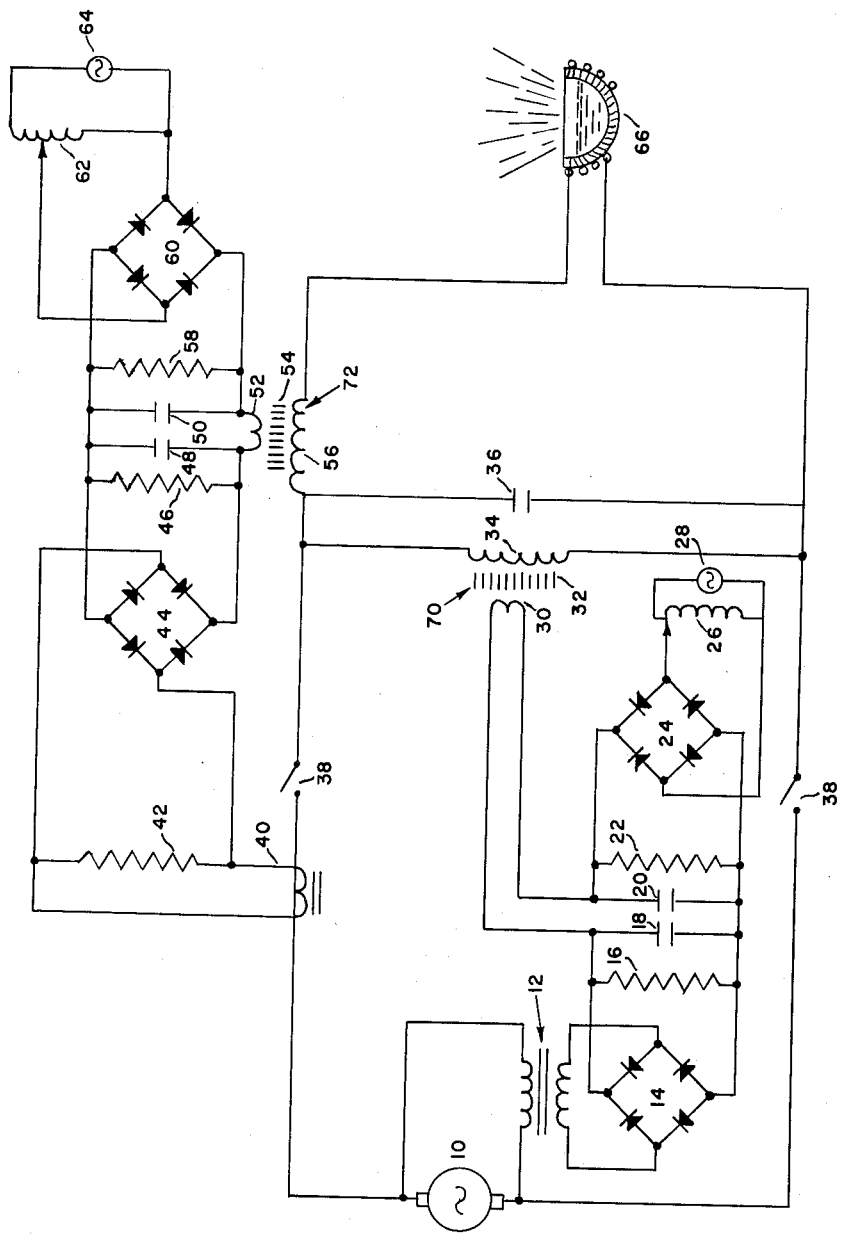

United States Patent Office 3,055,959
Patented Sept. 25, 1962

3,055,959
ELECTRICAL DEVICE FOR INDUCTION
FURNACES
John T. Vaughan, Brooksville, Fla., assignor to National
Research Corporation, Cambridge, Mass., a corporation
of Massachusetts
Filed Nov. 24, 1959, Ser. No. 855,218
7 Claims. (Cl. 13—26)

This invention relates to voltage current, and power factor regulation and more particularly to the use of saturable reactors to regulate voltage, current, power factor and effective input impedance related to a power source when the load has a variable impedance. Even more particularly, the invention relates to combining a load, saturable reactances and a capacitance to automatically sustain unity power factor or a predetermined matching power factor and effective optimum load conditions for a power source regardless of variations in load impedance.

In the prior art, saturable reactors have been used in power supply circuits to maintain, at a constant value, the current passing through a load such as an induction heating element. This has been done with both alternating and direct current circuits.

The present invention is directed to regulation of voltage, current, and power factor of an alternator supplying power to a load in such a way that the total load upon the voltage source or alternator may be maintained substantially unchanged and at a constant power factor regardless of changes in the impedance of the output load.

A principal object of the present invention is to provide a new means for efficiently controlling a voltage supply circuit in order to operate it near optimum efficiency.

A second object is to provide operation at a predetermined power factor by including saturable reactors in a circuit.

Still another object is to provide a simple and economical means for suppling power to high frequency induction heating coils.

Other objects of the invention will in part be obvious and will in part appear hereinafter.

The invention accordingly comprises the apparatus possessing the combination of elements, and the arrangement of parts which are exemplified in the following detailed disclosure, and the scope of the application of them will be indicated in the claims.

For a fuller understanding of the nature and object of the invention, reference should be had to the following detailed description taken in combination with the detailed drawing which is a schematic diagram of a high frequency induction heating system illustrating one arrangement of the components of the apparatus.

The present invention will be initially described in connection with its use for induction heating, particularly for induction heating and melting of materials, such as magnetic steels which undergo considerable change in circuit resistance and reactance as the temperature of the magnetic steel is raised. The apparatus of the present invention comprises an alternator supplying power to an induction heating coil coupled to the load, i.e. the magnetic steel being melted. The circuit includes a first saturable core reactor connected in series with the heating coil and the alternator. Means are provided for controlling the reactance of the series saturable reactor so that its reactance is decreased as the current from the alternator decreases, and the reactance is increased as the current from the alternator increases.

A second saturable reactor is also provided in parallel with the heating coil and means are included for changing the reactance of the second saturable reactor as an inverse function of the changes in the output voltage of the alternator. Thus, as the alternator output voltage decreases, the reactance of the parallel saturable reactor is increased. Conversely, as the alternator output voltage increases, the reactance of the parallel saturable reactor is decreased.

In a preferred embodiment of the invention, the series saturable reactor is controlled by providing two opposing voltages for regulating the amount of current flowing through the saturating winding. One of these opposing voltages is a rectified direct voltage obtained from a current transformer in series with the alternator. The other opposing voltage is obtained from a rectified constant voltage source. Thus, as the current output of the alternator increases, the rectified voltage will rise closer to the reference voltage, thereby decreasing the saturation current and increasing the reactance of the series saturable reactor.

The reactance of the parallel saturable reactor is controlled in a similar fashion by rectifying the voltage output of the alternator and supplying that voltage to one of the terminals of the saturating winding of the parallel saturable core reactor. The other terminal is held at a lower and constant voltage. As the voltage output of the alternator increases, the rectified voltage across the saturating coil increases, thereby increasing the saturating current. Accordingly, the reactance of the parallel saturable reactor is diminished, thereby returning the alternator voltage to the original value.

It should be noted that reactance of the main (high frequency) winding of a saturable core reactor decreases as current increases in the direct current (i.e. saturating) winding. Thus, as the saturating winding current is adjusted, it compensates for any change in voltage or current accurately and quickly.

For a fuller understanding of the nature and objects of the invention, reference should be had to the following detailed description taken in connection with the accompanying drawing wherein the FIGURE is a digrammatic schematic drawing illustrating a preferred embodiment of the invention.

The illustrated preferred embodiment comprises apparatus for regulation of voltage and power factor of an alternator 10 with the apparatus for control comprising a large capacitance 36, two saturable core reactors 70 and 72, a load 66 and two regulator circuits. The first saturable reactor 70 has a main or primary winding 34 connected to the terminals of alternator 10 in parallel with capacitance 36. (Switches 38 are normally closed.) The main or primary winding 56 of the second reactor 72 is connected in series with the load 66. The main winding 34 of the first saturable reactor 70 is wound upon a saturable iron magnetic core 32 (core 54 has similar characteristics). A saturating coil 30 for changing reactance of the main winding 34 is provided to compensate for any change in the alternator terminal voltage due to changes in the impedance of the load 66. This change in reactance of main winding 34 is of such a nature as to maintain substantially constant alternator voltage. The means for controlling saturation of core 32 is a voltage comparing circuit supplying a direct current to the saturating winding 30 of the saturable reactor 70. The amount of direct current is proportional to the difference between a fixed reference voltage and the terminal or output voltage from the alternator 10. The current in the direct current winding 30 is obtained in the following manner. The voltage of generator 10 is stepped down by transformer 12 and rectified by full wave bridge 14. From the bridge 14, a direct current output voltage proportional to alternator voltage is smoothed by filtering out the A.C. ripple on the D.C. voltage with an R-C filter (resistance 16 and capacitor 18). A fixed direct current voltage is supplied by rectifying A.C. supply voltage 28 set at a fixed value by autotransformer 26. This A.C. voltage is rectified by full wave bridge 24 and filtered by another R-C filter (resistance 22 and capacitance 20). This fixed voltage appearing across capacitance 20 is always less than the minimum rectified output voltage appearing across capacitor 18. The difference between these two direct current voltages appears across saturating winding 30. The amount of change of saturation current is thus dependent upon changes in alternator voltage due to the voltage comparison operation of the circuit. When the reactor core 32 is saturated, winding 34 will have less reactance, and due to increased current flow, alternator voltage will fall.

A second saturable core reactor 72 also has at least two windings with the main winding 56 connected in series with induction coil 66. The reactance of coil 56 is dependent upon the current passing through the alternator 10, so that the current will be maintained substantially constant in value regardless of changes in load impedance. The current through the saturation winding 52 is dependent upon the changes in alternator current. The current induced in the current transformer 40 is proportional to alternator current. This produces a voltage across resistor 42 proportional to current which is rectified by bridge 44 and is filtered by an R-C filter 46 and 48. The voltage from the filter is balanced with a higher and fixed voltage, and the difference is presented across saturation winding 52. The fixed voltage is maintained in the same way as that from voltage source 28. Voltage source 64, autotransformer 62, bridge 60 and the R-C filter (resistor 50 and capacitor 58) are the components used to produce it. With this arrangement, as the current from alternator 10 increases the amount of saturating current in saturable reactor 72 is decreased and the reactance of winding 56 is increased.

Thus, by use of the current and voltage regulation the power factor of the total input impedance (determined by using a Helmholtz-Thévenin equivalent circuit) is maintained substantially constant. The resistance and reactance values may be very close for all values of load impedance 66.

One possible problem characteristic to this circuit has been solved. Due to the fact that there are two correction circuits or two regulation circuits, continual hunting will occur if they have the same time constants. In order to prevent such variations the circuit is designed to include in one preferred embodiment a capacitor 48 which has greater capacity than capacitor 18. As a result of this feature hunting is considerably decreased although not eliminated. Of course other suitable delays may be used in accord with the spirit of the invention to eliminate hunting.

With respect to the alternator unity power factor or a predetermined power factor may be approached by tuning the circuit as one tunes a tank circuit. Tuning tank circuits is a well known art. For unity power factor operation the capacitor 36 should be chosen to produce resonance for reactances 34, 56 and 66 at design or operation frequency of the alternator. The variations in reactance 66 are compensated for by an almost equal and opposite combined reaction by reactors 70 and 72.

The contacts 38 are used to isolate the alternator from the load and may be placed elsewhere in the circuit.

Variations in alternator frequency can be compensated for by making capacitor 36 variable. Thus several types of alternators or frequencies of operation can be used. Generally, the frequencies in such a circuit are high and usually operating either reactively or capacitively is uneconomical compared to operation produced with a unity power factor circuit. Most alternators are most efficient when operating at unity power factor, because designed for a unity power factor load. When an alternator is designed for leading or lagging power factor loads, then the regulator may be suitably adjusted to match the load to the alternator.

The reactor may be designed to include more than one direct current winding to saturate the core. This is a matter of design technique. It depends upon the place of operation on the saturation curve and available circuit components.

Since certain changes may be made in the above apparatus without departing from the scope of the invention herein involved, it is intended that all matter contained in the above description, or shown in the accompanying drawings, shall be interpreted as illustrative, and not in a limiting sense.

What is claimed is:

1. Apparatus for regulation of voltage and power factor of an alternator operating as a source of alternating current, said apparatus comprising an alternator, a capacitance, two saturable reactors, and a load, a first of said saturable reactors having a primary winding connected to the terminals of said alternator in parallel with said capacitance, a second of said reactors being connected so that its primary winding is in series with the load, said parallel reactor including means for changing reactance of said primary winding to compensate for any change in the alternator terminal voltage due to changing load impedance, said means for controlling reactance comprising a saturable magnetic core for said parallel reactor, a saturating winding, and a voltage comparison circuit supplying a direct current to said saturating winding, said direct current being a direct function of the difference between a fixed reference voltage and the output voltage from the alternator, said series reactor having a primary winding connected in series with said load so that the reactance of said series reactor is changed by core saturating means maintaining alternator current flowing substantially constant, said saturating means comprising a saturating winding provided with current which is a function of the difference between said alternator current and a stable reference current.

2. Apparatus maintaining an alternator operating at substantially constant output voltage and current while providing power for an induction heating coil, said apparatus comprising said alternator, a variable inductance in parallel with a capacitor and in parallel with the series combination of a second variable inductance and said induction heating coil load, said first variable parallel inductance comprising a winding upon a first magnetic core having at least a second winding, said second winding upon said first core being excited by the voltage difference between a first rectified standard alternating voltage and the rectified output voltage of the alternator, the current in said second winding on said first core changing the reactance of said parallel inductance by an inverse function of changes in alternator voltage, said second variable inductance comprising a winding upon a second magnetic core having at least a second winding, said second winding on said second core being energized by current proportional to the difference between a second rectified standard alternating voltage and a voltage proportional to the rectified output current of the alternator, the current in said second winding on said second core changing the reactance of said series inductance by a direct function of changes in alternator current.

3. Apparatus for regulation of voltage, current and power factor of an alternator supplying power to a load comprising a series combination of an induction heating element load and a first saturable core reactor, the series combination being connected to said alternator, said first saturable reactor having a reactance which is a function of changes in alternator current and a parallel reactor comprising a second saturable core reactor connected in parallel to said series combination, said parallel reactor having a reactance which is an inverse function of the changes in terminal voltage of said alternator.

4. Apparatus for regulation of voltage and power factor of an alternator supplying power to a circuit having a load comprising an induction heating coil, a first saturable-core series reactor connected in series between said load and said alternator, said series reactor having a reactance which varies as a direct function of changes in the amount of alternator current, a second saturable-core parallel reactor connected in parallel with the load, said parallel reactor having a reactance which is an inverse function of changes in the terminal voltage of said alternator and a capacitor connected in parallel with said parallel reactor, such that the power factor of said circuit with respect to said alternator is substantially maintained at a predetermined value.

5. Apparatus for regulation of voltage and power factor of a load energized by an alternator supplying power to said load comprising a saturable series reactor connected in series with said load, means for varying the reactance of said series reactor as a direct function of changes in alternator current, a second saturable core parallel reactor in parallel with said load, means for varying the reactance of said parallel reactor as an inverse function of the changes in terminal voltage of said alternator, and a capacitor connected in parallel with said parallel reactor, such that the power factor of the circuit is maintained near unity.

6. Apparatus for regulation of voltage and power factor of an alternator connected to a reactive load, said apparatus comprising a first saturable reactor with inductance changing as a direct function of changes in alternator current, said first reactor connected in a series combination with said load, a capacitance and second saturable reactor in parallel with said series combination, the reactance of said second reactor varying as an inverse function of changes in output voltage of said alternator, said series combination, said second reactor, and said capacitor being connected to said alternator.

7. Apparatus for regulation of voltage, current and power factor of an alternator in an alternating current circuit comprising an alternator supplying energy to a series combination and a parallel combination, said combinations placed in parallel, said parallel combination comprising a first saturable reactor and a capacitor, said first reactor having a reactance varying as an inverse function of changes in terminal voltage of said alternator, said series combination comprising a second saturable reactor and a load impedance, said second reactor having a reactance varying as a direct function of changes in alternator current, and providing substantially a predetermined power factor operation for said alternator by the operation of said saturable reactors, said capacitor and said reactors being tuned to provide such power factor regardless of changes of load impedance.

References Cited in the file of this patent

UNITED STATES PATENTS

| | | |
|---|---|---|
| 1,948,704 | Fischer | Feb. 27, 1934 |
| 2,821,679 | Robinson et al. | Jan. 28, 1958 |